July 29, 1941.  H. THOMAS ET AL  2,250,507
CYCLE TIMER APPARATUS
Filed Aug. 20, 1937  6 Sheets-Sheet 3

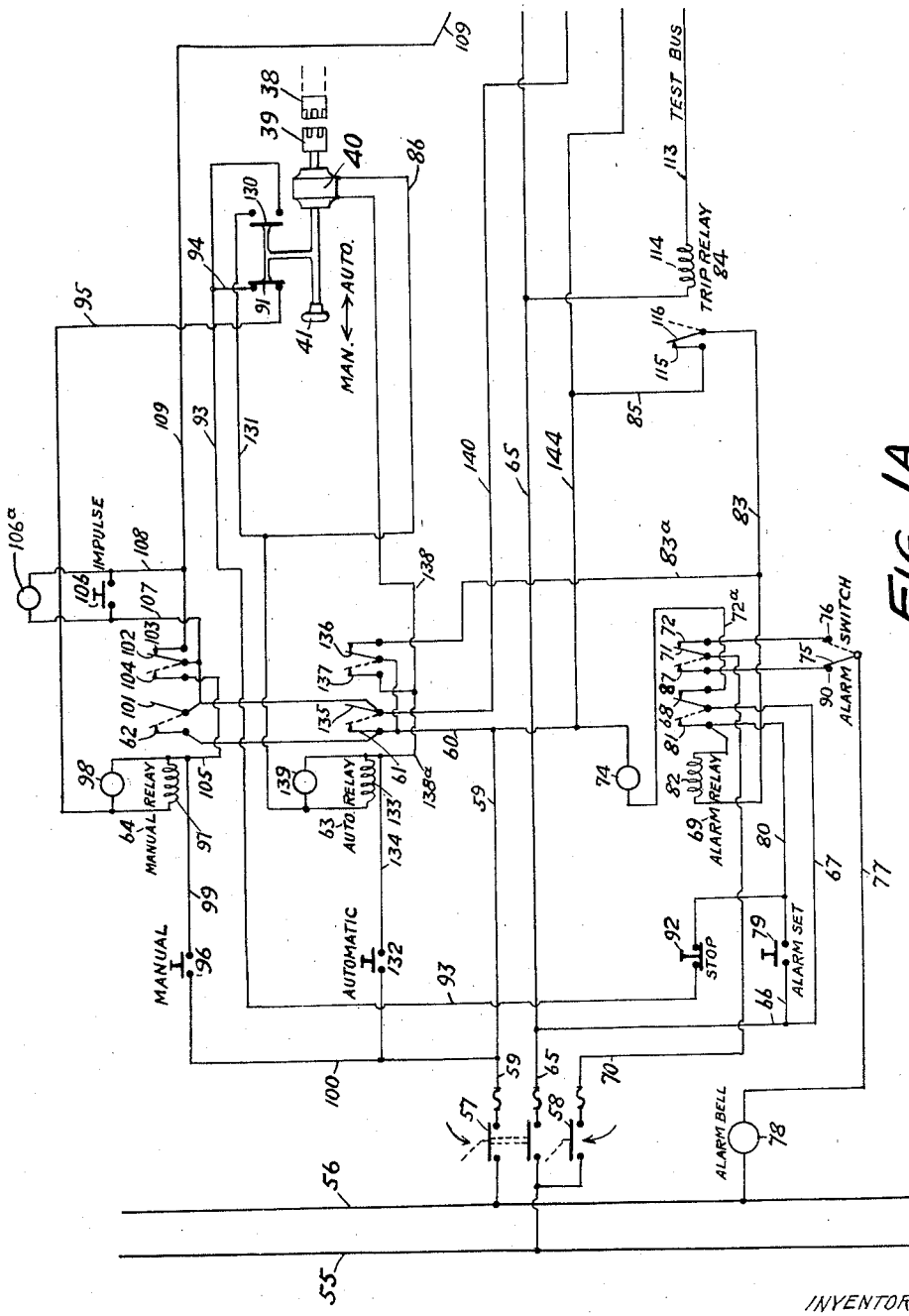
FIG. IA.

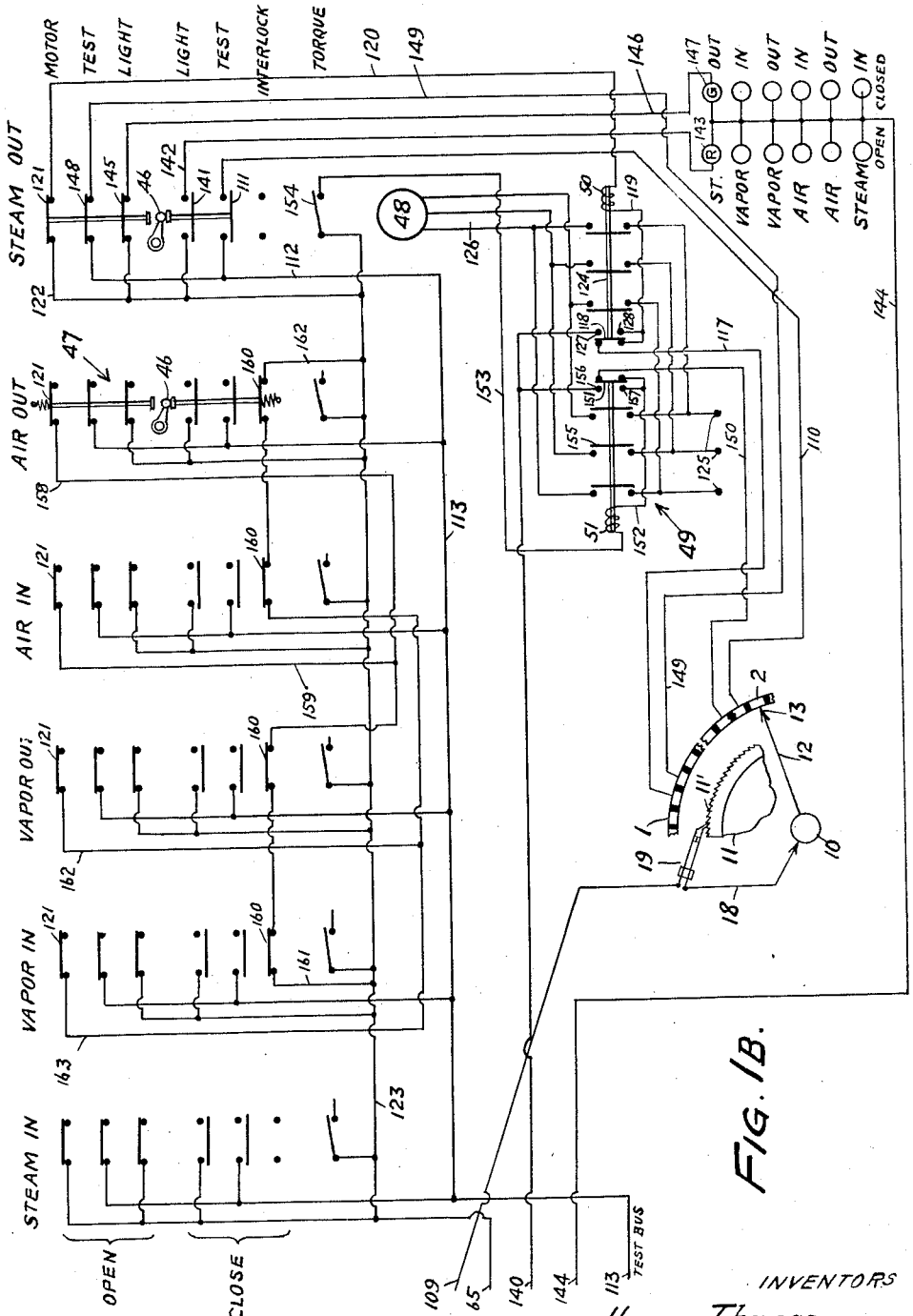

WITNESS:
Rob R Mitchel

INVENTORS
Henry Thomas
John M. Pearson and
Edward J. Nopper
BY
Bruer and Harding
ATTORNEYS.

July 29, 1941.    H. THOMAS ET AL    2,250,507
CYCLE TIMER APPARATUS
Filed Aug. 20, 1937    6 Sheets-Sheet 4

WITNESS:

INVENTORS
Henry Thomas
John M. Pearson and
Edward J. Nopper
BY
ATTORNEYS.

July 29, 1941. H. THOMAS ET AL 2,250,507
CYCLE TIMER APPARATUS
Filed Aug. 20, 1937 6 Sheets-Sheet 5
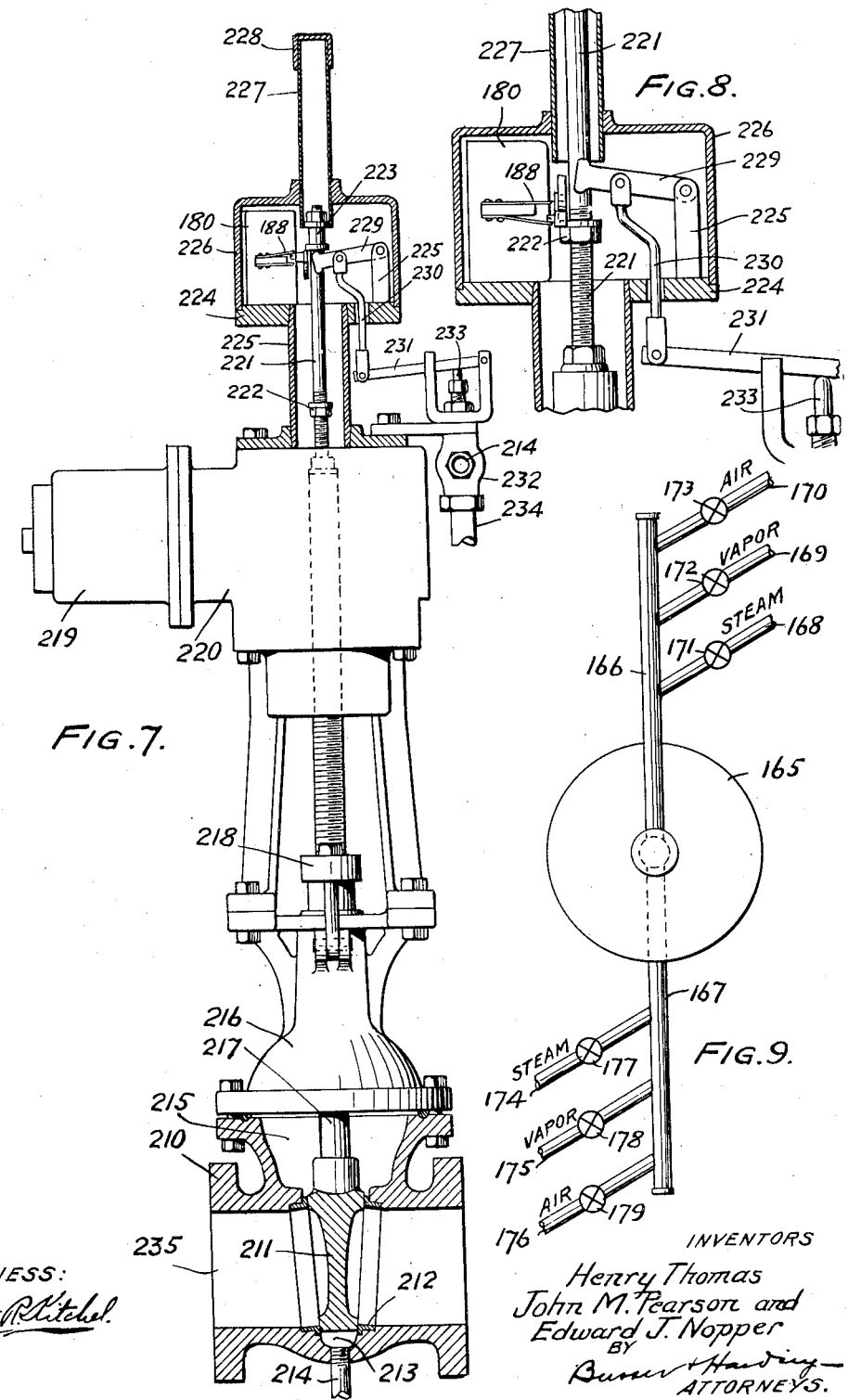
INVENTORS
Henry Thomas
John M. Pearson and
Edward J. Nopper
BY
Burns & Harding
ATTORNEYS.
WITNESS:
Rob R Kitchel July 29, 1941.   H. THOMAS ET AL   2,250,507
CYCLE TIMER APPARATUS
Filed Aug. 20, 1937   6 Sheets-Sheet 6

WITNESS:
Rob R Litchel.

INVENTORS
Henry Thomas
John M. Pearson and
Edward J. Nopper
BY
Busser and Harding
ATTORNEYS.

Patented July 29, 1941

2,250,507

UNITED STATES PATENT OFFICE 2,250,507

CYCLE TIMER APPARATUS

Henry Thomas, Ridley Park, John M. Pearson, Swarthmore, and Edward J. Nopper, Lansdowne, Pa., assignors, by mesne assignments, to Houdry Process Corporation, Wilmington, Del., a corporation of Delaware Application August 20, 1937, Serial No. 160,122

3 Claims. (Cl. 177—311)

The present invention relates to an apparatus for automatically timing the operation of the valves which control the feed of fluids to and from a process involving catalysis, and relates more particularly to such a device for automatically timing and actuating the valves passing various necessary fluids to and from a catalytic chamber in which hydrocarbon vapors are cracked or otherwise refined, and in which the catalytic material is regenerated in situ after its activity during the cracking or refining portion of the cycle has become so impaired as to necessitate its reactivation.

In the vapor phase catalytic cracking or refining of hydrocarbons, the catalyst becomes reduced in activity as the cracking cycle progresses, and after a time its activity becomes so reduced that further passage of reactant fluids to the catalytic case or chamber results in uneconomical operation. It is therefore necessary in such a process to regenerate the catalyst which, in the present instance, takes place while the catalyst remains in the catalytic chamber. Before regeneration, which is usually effected by burning or oxidizing the catalyst contaminants, the residual vapors in the case, remaining after the cracking portion of the cycle has been completed, must be removed. This, in the present instance, is effected by purging the case with steam or other inert gaseous medium. The catalyst, after being purged with steam, is then regenerated or reactivated by admitting an oxidizing gas, such as heated air, in order to burn the contaminating substances (principally carbon) from the catalyst. After the regeneration portion of the cycle has been completed, it is necessary to remove residual products of combustion and oxidizing medium from the case. This, as in the case of the residual hydrocarbon vapors, is effected by again purging the catalyst with steam, after which operation the cycle begins again with the admission of hydrocarbon vapors to the case to be cracked or refined.

Since the hydrocarbon vapors, purging steam, and oxidizing medium enter the case at a common inlet, flow therethrough in the same direction, and leave the case at a common outlet, it is necessary that a very strict control be maintained on the valves governing the admission and exit of these various fluids to and from the case. Since, in some instances the cycle may be carried out in a half hour or less, it is readily apparent that a large number of valve actuating operations must be carried out within a short period of time, and in a proper sequence. Further, since the cracking or refining portion of a cycle is only from 10–15 minutes in duration, it will be readily apparent that the catalytic chamber is performing a useful function for only about one-third of the cycle time. Therefore, in order to maintain a continuous flow of product from the process, it is necessary that three or more catalytic cases be used, so that a constant supply of hot hydrocarbon vapors may be continuously passed into contact with a catalyst and then to fractionating or other condensing means.

With the foregoing in mind, it is apparent that the number of valve actuations is multiplied by three or more, depending upon the number of catalytic cases or chambers employed. Due to the complexity of such an operation, it is necessary that automatic timing means be employed for the control and actuation of the various fluid controlling valves in the system.

It is therefore an object of the present invention to provide an apparatus which will automatically and effectively operate the valves for each single catalytic chamber in timed sequence, as set forth above.

A further object is to provide interlocking switch means to prevent the opening of a hydrocarbon vapor valve or an air or other oxidizing medium valve, at the same time, to thereby prevent the simultaneous flow of two such fluids either into or out of the case, and the formation of an explosive mixture.

It is a further object of the invention to provide testing and alarm means to insure the operation of a valve before the next valve operation in sequence is carried out.

Other objects will be apparent as the description progresses, for which purpose reference may be had to the accompanying drawings of which:

Fig. 1A represents a wiring diagram showing the various relays and control buttons used in controlling the operation;

Fig. 1B represents a wiring diagram including the various switches which are operated by the movement of the valves employed to feed the various fluids to and from the process, as well as a portion of the control mechanism;

Fig. 7 is an elevation partly in section of a typical valve.

Fig. 8 is an enlarged detail of the valve stem and the switches controlled thereby.

Fig. 9 is a plan view showing diagrammatically the valve arrangement for a single case.

Figure 2:
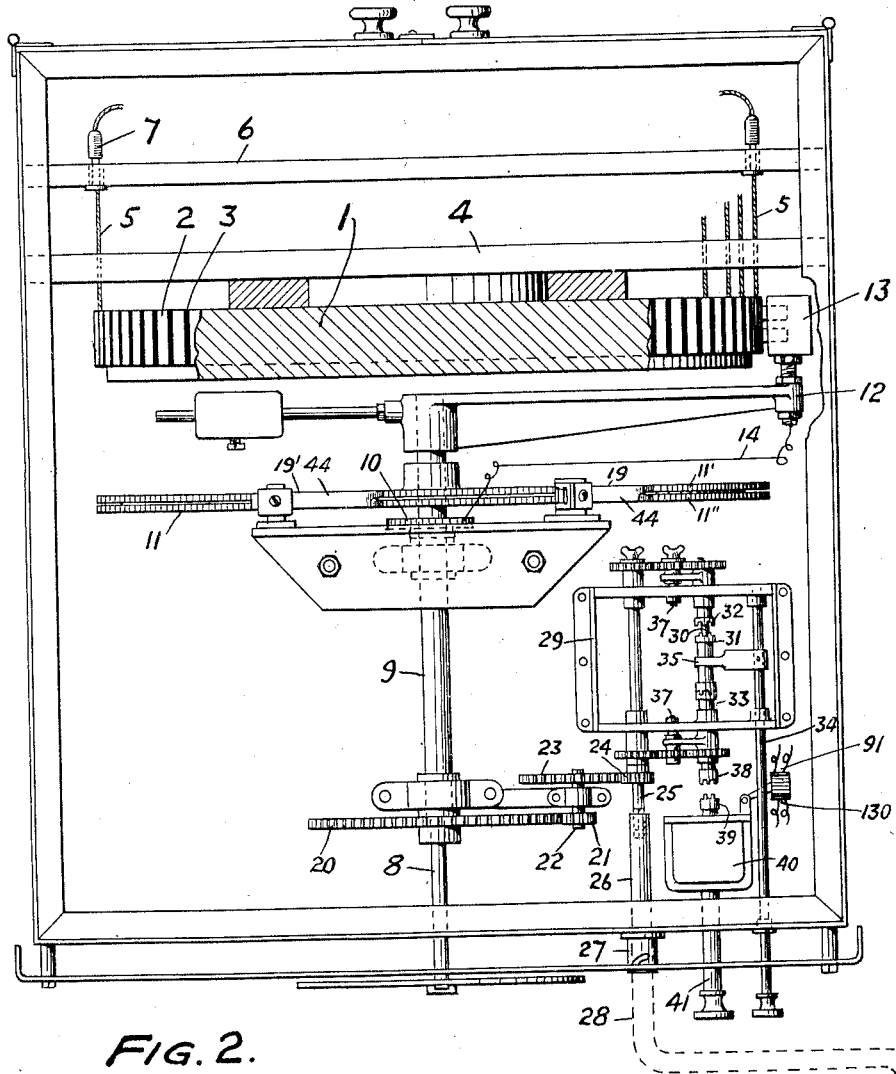
Fig. 2 is a plan view, partly broken away, showing the actual timing mechanism for controlling and operating the valves.
Figure 3:
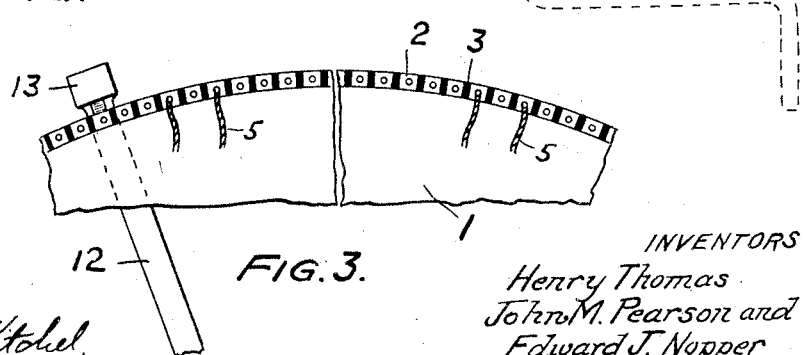
Fig. 3 is a partial view of the commutator and contact arm included therein.

Referring now to Fig. 2, the numeral 1 indicates a fixed circular commutator having contacts 2 and insulating segments 3 therebetween. Commutator 1 is fixed to a support 4, and properly centered with respect to the balance of the mechanism by any means desired. Each of the commutator bars or contacts 2 is connected by means of a wire 5 with a terminal board 6 in the rear of the commutator. Each of the wires 5 terminates in a jack, to which electrical connection may be made by means of a plug 7. In the particular device to be described, the commutator will have 270 segments, to be used with a cycle time of approximately 45 minutes (2700 seconds). In the front of the commutator 1 there is a shaft 8 which increases in diameter as shown at 9 carrying a contact wheel 10, electrically insulated from shaft 9 (Fig. 4) and a double toothed wheel 11 having two segments 11' and 11'' (Figs. 5 and 6) of Bakelite or similar insulating material. The inner end of the shaft 9 carries a counterbalanced arm 12, which is suitably insulated therefrom and which in turn carries brush 13 making a contact with the commutator bars 2, as the arm travels around the commutator. The brush is electrically insulated from the arm 12 and is connected by wire 14, passing through and insulated from toothed disc 11, with contact wheel 10. A brush 17, which is connected by wire 18 to switches 19 and 19' on the periphery of the toothed disc, contacts collector ring 10, thereby passing current continuously from wire 18 through brush 17 to the collector ring 10 and thence through wire 14 to the brushes contacting the commutator. The shaft 8 has mounted thereon a large pinion 20 meshing with a small pinion 21 mounted on journaled shaft 22. The other end of journaled shaft 22 has mounted thereon a large pinion 23 which in turn meshes with a small pinion 24 mounted on shaft 25. The shaft 25 is fixed to a stub shaft 26 having a bayonet type coupling 27 to which may be affixed a crank 28 for manual operation. The shaft 25 passes through a gear and clutch box 29, which also has a shaft 30 passing therethrough and journaled therein. Gearing, placed on the outside of gear box 29 at each end thereof, connects the shaft 25 to shaft 30 through a clutch having a movable member 31 to fixed members 32 and 33, the movable member 31 being operated by reciprocating a rod 34 to which the movable member is connected by ring 35. The gear trains between the shafts 25 and 30 may be of different ratios so that either ratio may be employed by reciprocating the rod 34 to engage the movable clutch member with either of the fixed clutch members. It is also apparent that while the clutch is engaged on one side, the gearing on the other side may be readily changed by removing the wing nuts provided and loosening the shaft by means of nuts 36 or 37 as the case may be. One end of the shaft 30 has a clutch member 38 affixed thereto adapted to engage another clutch member 39 attached to the shaft of a synchronous motor 40. The synchronous motor 40 is adapted to be moved toward or away from the gear box 29 by means of a rod 41 to engage or disengage the clutch members 38 and 39.

Figure 4:
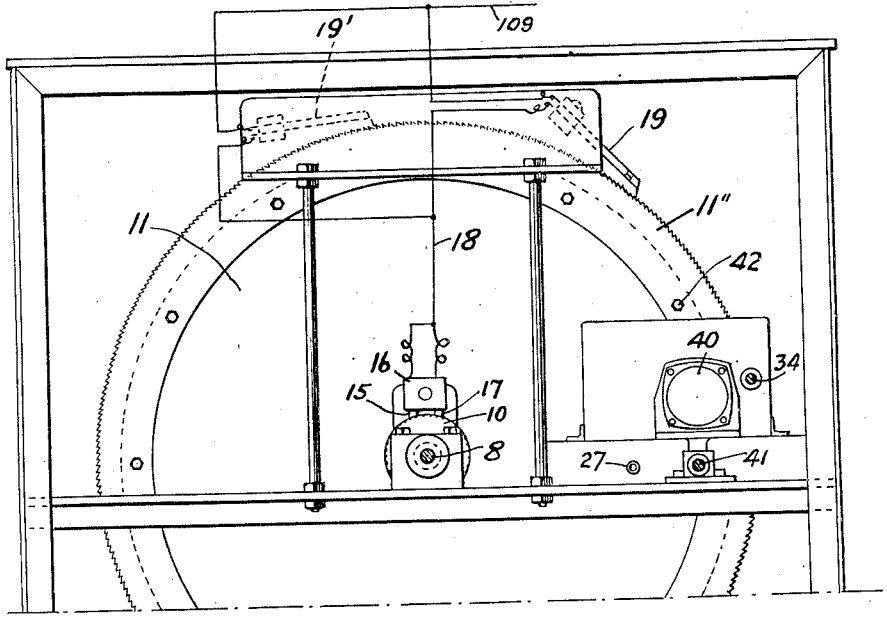
Fig. 4 is a partial front elevation of the timing mechanism with the front cover plate removed.
Figure 5:
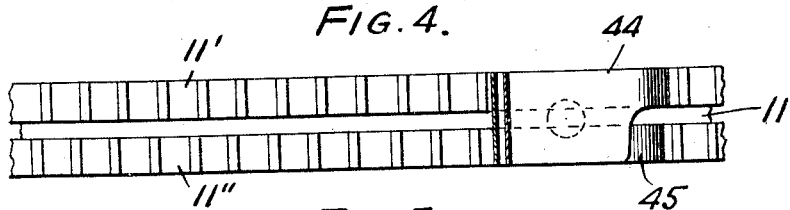
Figs. 5 and 6 are enlarged views showing in detail the make and break switch for sending controlled electrical impulses through the system.
Figure 6:
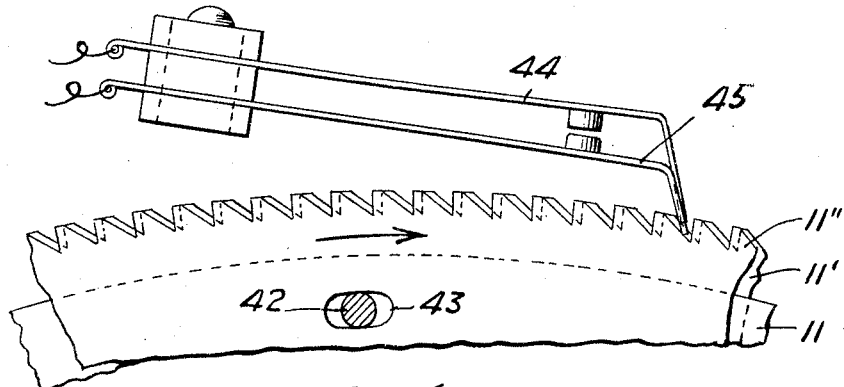

The circular disc 11 Figs. 4, 5 and 6 heretofore mentioned, has affixed to its periphery the two toothed similar insulating material annuli 11' and 11'' by means of bolts 42 passing through slots 43 in each annulus by means of which the position of the toothed annuli with respect to each other may be varied. Contacting the two annuli 11' and 11'' at their periphery are two switches 19 and 19' which are set to open and close at exactly the same time, one being a spare for the other. Each switch has an upper member 44 and a lower member 45, each contacting one of the toothed annuli. As the annuli are rotated by the shaft 8, the two spring elements 44 and 45 will ride up upon the inclined surfaces of each tooth. Referring now to Figs. 5 and 6, it will be observed that if the rotation is in a clock-wise direction, and the annuli are positioned as shown in Figs. 5 and 6, that spring member 44 will first reach the outer periphery and that shortly thereafter member 45 will also reach the periphery. Member 44 will shortly thereafter lose the support of the periphery due to passing over one of the notched places, and will spring downwardly until the two contact buttons between members 44 and 45 hit and thereby close the circuit, so that an electrical contact will be maintained through members 44 and 45, until notched annulus 11'' passes to such a position that member 45 will drop. At this time contact will be broken as member 44 cannot descend as low as spring member 45. From the foregoing it is apparent that when the synchronous motor 40 is pushed forward and clutch members 38 and 39 are engaged that the arm 12 carrying brush holder 13 will be revolved about commutator 1 and that disc 11 carrying notched annuli 11' and 11'' will also be rotated at the same speed as will commutator or disc 10. Since the current flows into the upper element 44 of switch 19 and out through the lower element, and since contact and the circuit therethrough can only be made at certain predetermined positions of the annuli, 11 and 11', these elements can be so adjusted that no current will flow to the brush 13 and through the commutator bars 2 unless the brush 13 is positioned directly over a single commutator bar 2. It is apparent that the annuli 11 and 11' can be so positioned that a circuit through the device just explained may be made when the brush 13 is at any position on the commutator bars 2.

Each of the valves which it is desired to control is motor operated, and has associated therewith a switch of the type diagrammatically illustrated in Fig. 1B and numbered 47 under the legend "Air out." Each switch contains elements capable of opening or closing six circuits, three of which are open when the valve is in the open position, and two of which are open and one of which is closed when the valve is in its closed position. When the valve is either opening or closing, the switch, which is operated by an arm 46 which is operated by abutments on the valve stem, is in a neutral position with the five uppermost contacts closed, and the lowermost contact open. As soon as the valve starts to open or close, the arm 46 is freed by the abutment on the valve stem and moves to permit the switch to return to its neutral position where it is held by springs until the valve stem reaches the opposite position and the other abutment moves the arm 46 in the reverse direction, thereby operating the other portion of the switch mechanism. There are diagrammatically illustrated in Fig. 1B six switches such as 47 and designated "Steam in," "Vapor in," "Vapor out," "Air in," "Air out" and "Steam out."

In addition to the above described switch, each valve has associated therewith a torque switch which is adapted, as will be more fully described, to open the power circuit to the motor. Each valve is operated by a motor, only one of which is herein shown in conjunction with the steam outlet valve and designated 48. Controlling the current supply to motor 48 is a three-phase reversing switch diagrammatically illustrated and designated as 49, which is employed for the purpose of reversing the rotation of the motor to open or close the valve as the case may be. The switch is thrown to open or close the valve by means of solenoids 50 and 51 respectively. There is also diagrammatically illustrated in Fig. 1B the commutator 1, collector ring 10, rotating arm 12, and the disc 11 carrying notched discs 11' and 11" operating switch 19. There is further illustrated a series of signal lights, two for each valve, those for the valve designated "Steam out" being shown connected to their proper switch elements, and noted R and G, R denoting the valve is in its open position, G denoting it in its closed position.

In Fig. 1A there is illustrated the various relays, switches, etc., each of which has a legend showing its function.

The current for the control circuits is obtained from power lines 55 and 56, which may supply 110 volt, 60 cycle current to furnish power for controlling valves, indicating lights, operating the timer, and energizing relays. Two circuit breakers 57 and 58 are supplied, the main breaker 57 being a two-pole breaker providing power for controlling the operation of the various valves, etc. The breaker 58 is single pole and is used only to furnish power to operate an alarm bell in case of trouble. It is desirable that the alarm be supplied through this separate breaker in order to give warning should a short circuit or any other trouble develop which might cause the main breaker 57 to open. It is obvious that if the alarm were taken from the main breaker, then, when this breaker opened the alarm circuit would be dead and could give no warning.

Assuming that breakers 57 and 58 are open as shown, all control circuits will be dead and all relays will be in their normal de-energized positions, as shown. Closing breaker 57 will make control power available through lines 59 and 60, as far as contact points 61 and 62 of the automatic and manual relays 63 and 64 respectively. Power will also be available through lines 65, 66, 67 to switch 68 of alarm relay 69 to line 72a, alarm light 74, 60 to line 59, which will cause light 74 to burn. Closing alarm breaker 58 will make power available through line 70 and through switch 71 thence through contact point 72. If alarm switch 75 happens to be on pole 76, then power will be available through line 77 to alarm bell 78, and thence to supply line 56, thus causing the alarm bell to ring.

If the alarm set button 79 is now pressed down, power will be available from line 65 through line 66, alarm set button 79 and line 80 to contact point 81 of the alarm relay 69. Power will also flow through alarm relay coil 82 from line 80 and thence through line 83 and contacts 115, 116 of trip relay 84 and line 85 to line 144 and line 60, thus closing the circuit and energizing the alarm relay so that the switch 71 thereof is pulled away from pole 72 and now contacts with contact point 87. Likewise switch 68 of the alarm relay is now brought into contact with contact point 81, so that as the alarm set button is released, current to the alarm relay coil 82 will be fed from line 66 through line 67, switch 68 and contact point 81 to the relay coil 82, and thence as heretofore described through line 83 thus keeping this relay energized when the alarm set button 79 is released. In addition to the circuit through contacts 115 and 116 of trip relay 84 for energizing alarm relay coil 82 there is a parallel circuit from 83 through 83a to switch 136, 60 to 59 which parallels and shunts contacts 115 and 116 as long as the automatic relay is de-energized.

It is apparent that as the relay switch 71 is disconnected from contact point 72, the circuit to the alarm bell 78 is broken if the alarm switch 75 is resting on pole 76 thereof. Similarly, the circuit through the alarm light 74 is broken as relay switch 68 disconnects from contact point 72a. If alarm switch 75 happens to be resting on pole 90 of the alarm switch when the alarm relay is energized, and switch 71 contacts contact point 87, the circuit through the alarm bell will be closed and the operator must then throw the alarm switch 75 over to engage pole 76 so that the alarm bell is shut off, and the alarm switch 75 is in the proper position to give a warning should any trouble arise.

Assuming that it is desired to operate manually, the timer motor 40 must be moved so that the clutch members 38 and 39 are disengaged. Disengaging the clutch will cause the motor to take the position shown in the drawings, so that switch 91 is closed, thus so long as the alarm relay is energized power is available from line 66 through line 67, switch 68, contact 81 and line 80 to stop button 92, thence through lines 93 and 94, to switch 91, thence through line 95 as far as the manual relay 64. If the manual push button 96 is now depressed, the circuit will be closed through the manual relay coil 97, and light 98 in parallel therewith, and thence through lines 99, manual button 96 and line 100 to line 59. Since this circuit is now closed, the manual relay coil 97 will be energized and switch point 101 will be brought into contact with switch point 62, while switch point 102 will be disconnected from contact point 103 and brought into contact with contact point 104. Since switch 102 is in contact with contact point 104, and switch 101 is in contact with contact point 62, current from line 59 will be available through line 60, contact point 62, switch 101, switch 102, contact point 104 and line 105 to the manual relay coil 97, thus keeping this coil energized when the manual push button 96 is released. Similarly, energizing manual relay 64 and thus separating switch 102 from contact 103 opens the circuit to the timer, power now being available from line 59 through line 60, contact point 62 and switch 101 and line 107 to impulse button 106 and impulse light 106a in parallel therewith. When impulse button 106 is depressed power is available through lines 108 and 109 to the timer and the circuit for controlling the operation of the valves is closed as hereinafter described. It will be apparent that light 106a will burn only when the brush 13 of the timer is in contact with a segment 2 of the commutator which is connected to a circuit for performing a valve operation as hereinafter described, thus indicating to the operator that his circuit is complete and he can depress button 106 for operation. The light, 106a, itself must be of low wattage in order to limit the current available through it to the valve operating coils so they will not be operated until the button 106 is depressed.

When it is desired to operate automatically, the timer motor 40 is moved into position so that clutch members 38 and 39 are engaged, thereby closing switch 130 so that power is available through line 93, switch 130 in line 131 as far as the automatic relay 63. Moving the timer motor 40, so that the clutch members are engaged, opens switch 91, thereby breaking the circuit through manual relay 64 so that this relay is no longer energized and the switches controlled thereby return to their normal de-energized position shown in the drawings. When the automatic relay button 132 is depressed, current will be available through the automatic relay coil 133 from line 100, automatic push button 132, and line 134, thereby closing the circuit and energizing coil 133.

When the automatic relay coil 133 is energized, switch 135 is brought into contact with contact point 61, and switch 136 is brought into contact with contact point 137, thereby a circuit through the automatic relay coil 133 from line 131 is closed through line 138, contact point 137, switch 136 to line 60 thereby keeping coil 133a and light 139 in parallel therewith, energized when the automatic push button 132 is released. Likewise switch 136, when brought in contact with point 137, breaks contact with point 83a allowing all current for coil 82 of relay 69 to flow through the contacts 115 and 116 of relay 84, thus rendering relay 84 operative when on automatic control. Current is also supplied through line 60 and switch 136 contact point 137 and line 138 to the timer motor 40, thereby closing the circuit to the motor through lines 86, 131, switch 130, 93, button 92, 80, contacts 81 and 68, 67 and to line 85 and causing the same to operate. When the automatic relay is energized, switch 135 is brought into contact with contact point 61 so that power is now available from line 59 through line 60, contact point 61, switch 135 and line 107 to switch 102, now in contact with contact point 103, and thence through line 109 to the timer. The operation of the motor 40 causes the timer to operate thereby closing the circuit through the same and controlling the operation of the valves in the manner hereinafter more fully described.

Referring now in particular to Fig. 1B, it is to be noted as heretofore stated, that each of the valves controlling the admission to, or withdrawal of reactants from the reaction chamber is provided with a switch mechanism controlling six circuits. These switches are diagrammatically shown in Fig. 1B, and are designated "Steam in," "Vapor in," "Vapor out," "Air in," "Air out," and "Steam out." Each of these switches is shown in the position it would be when the valves are completely closed. For the sake of simplicity only the switch connected to the "Steam out" valve will be described in detail. As stated, this switch is shown in its closed position, and therefore the circuit is closed to the green light 147, which burns when the Steam out valve is closed, the lights being fed directly from the supply lines 59 and 65. The line 65 is connected to the bus line 123 and thence through line 122 and switch 145 and line 146 to light 147, the other side of the circuit being from line 59 and lines 60 and 144, directly to the light 147. Should the valve be completely open, the switch 145 will of course be open and therefore the circuit through light 147 is broken. However, if such is the case switch 141 is closed and therefore the circuit through red light 143 is closed, and this will be burning, the circuit being as heretofore described, except that current from line 122 flows through switch 141 and thence through line 142 to light 143, rather than through switch 145 and line 146. If the valve is midway between its full open or full close position, both switches 141 and 145 will be closed and therefore both lights 143 and 147 will be burning.

Similar lights are provided for each of the valves, and the operator can thus tell at a glance whether the valve is fully opened or fully closed, or midway between these positions. The lights being fed directly from the lines 59 and 65 through circuit breaker 57 will, of course, be burning regardless of the position of the manual or automatic relays and regardless of whether the alarm bell is energized when a test is made to determine the position of the valves as hereinafter described in detail.

From the foregoing description it is apparent that when the motor 40 is set for automatic operation and the automatic relay 63 is closed, that power will be available through line 109 as far as the contact point 19 on the timer, and that when the brush 13 is in contact with a commutator segment 2 of commutator 1 these contact points will be closed and power will be available through the commutator segment 2 to whatever line that particular segment happens to be connected. Similarly, when the motor 40 is positioned for manual operation and the manual relay 64 is closed, power will be available as far as the manual impulse button 106 and when this impulse button is depressed, when the brush 13 is in contact with a commutator segment 2, power will be available through the commutator 1 to whatever line this segment happens to be connected.

Figure 10:
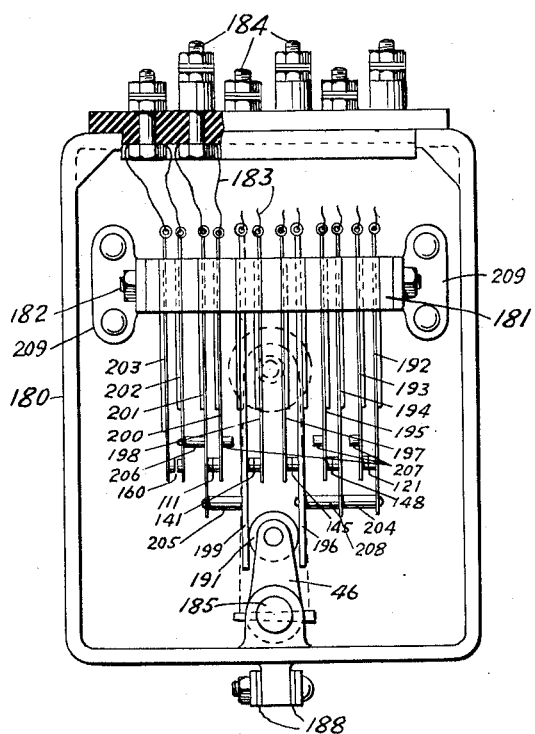
Fig. 10 is a side elevation of the switches controlled by the valve with the cover plate removed.
Figure 11:
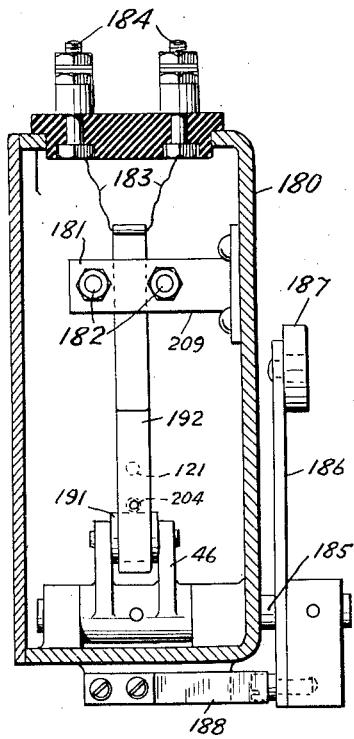
Fig. 11 is a plan view of the switches controlled by the valve with the top of the switch box removed.
Figure 12:
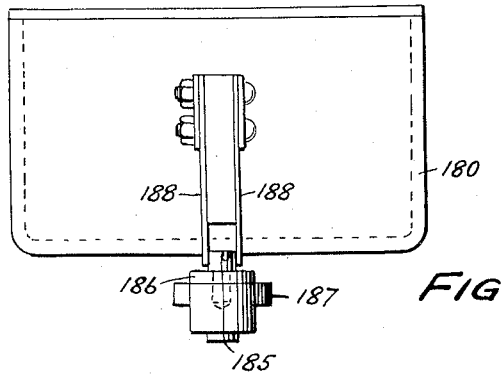
Fig. 12 is an end view of a switch box.

These switches 47 are shown in detail in Figs. 10, 11 and 12 and reference should be made to these figures for a complete understanding of their operation. The switches are enclosed in a switch box 180. Each switch consists of an upper and a lower spring member which are separated from each other and adjacent switches by insulating blocks 181 which are held in assembly by bolts 182 passing through blocks 181 and brackets 209 secured to switch box 180. Each switch member is connected by a wire 183 to a terminal post 184. A shaft 185 journaled in the switch box and extending through one wall thereof, has an arm 186 mounted on its outer end, carrying at its free end a wheel or other projection 187, adapted to engage projections on the valve stem. This arm 186 is normally held in a horizontal position by springs 188. An arm 46 is secured to the shaft 185 within the switch box and carries on its free end a wheel or bearing block 191 of insulating material such as Bakelite, which is adapted to operate the switches. The switch 121 which controls the current for operating the motor for opening, consists of an upper member 192 and a lower member 193. The switch 148 likewise consists of an upper member 194 and a lower member 195. The switch 145 consists of an upper member 196 and a lower member 197. The switch 141 consists of an upper member 198 and a lower member 199. The switch 111 consists of an upper member 200 and a lower member 201. The switch 160 consists of an upper member 202 and a lower member 203. The arm 186 outside the switch box and likewise the arm 46 within the switch box, are shown in the position in which they are normally urged by the springs 188 when the wheel 187 is not engaging either of the projections on the valve stem, in other words, these arms are in the position which they assume when the valve stem is intermediate the fully opened or fully closed position of the valve.

The wheel 191 on the arm 46 engages the upper member 196 of the switch 145 and the lower member 199 of the switch 141. The upper members 192 and 194 of the switches 121 and 148 respectively are held in spaced relationship by an insulating post 204. Likewise upper members 194 and 196 of switches 148 and 145 respectively are held in spaced relationship by insulating post 208. The lower members 199 and 201 of the switches 141 and 111, respectively, are fastened together in spaced relationship by insulating post 205, while the lower member 201 and upper member 202 of switches 111 and 160, respectively, are fastened together in spaced relationship by insulating post 206. Insulating buttons 207 may be secured to either or both the upper or lower members of adjacent switches which are not held in spaced relationship. As here shown, these buttons are secured to the lower members 193 and 195 of switches 121 and 148, respectively, to prevent accidental contact being made between these members and the upper members 194 and 196, respectively of switches 148 and 145. An insulating button 207 is likewise shown attached to upper member 200 of switch 111 to prevent accidental contact between this member and lower member 199 of switch 141.

As here shown, when the valve is intermediate its fully opened or fully closed position, and therefore when the arm 186 is in a horizontal position, the five upper switches 121, 148, 145, 141 and 111 are closed, while the lowermost switch 160 is open. When the valve is closed a projection on the valve stem, as it reaches its fully closed position, will hit the wheel 187 and therefore turn the arm 186 and arm 46, which is secured to the same shaft, downwardly, thereby causing the wheel 191 to press the lower member of switch 141 downwardly and thus separating the two members of the switch and opening the switch. Since the lower member 201 of switch 111 is held in spaced relationship to switch member 199, it will also be pressed downwardly, thereby opening switch 111. Since the upper member 202 of switch 160 is held in spaced relationship to lower member 201 by post 206, member 202 is pressed downwardly, thereby closing switch 160. The upper three switches 121, 148 and 145 will remain closed. As soon as the valve is started to open and the valve stem rises, the arm 186 will be raised by springs 188 and arm 46, and wheel 191 carried thereby will rise, thus permitting the lower members of switches 111 and 141 to rise, thereby closing these switches. As the valve nears its fully open position a projection on the valve stem will hit the wheel 187 and as the valve is completely opened, the arm 186 is raised by this projection, thereby raising wheel 191 carried by arm 46. As wheel 191 rises it will raise the upper member 196 of switch 145, and since upper members 192 and 194 of switches 121 and 148 are held in spaced relationship thereto by insulating posts 204, these members are also raised, thereby breaking the opening switches 121, 148 and 145, whereas the three lowermost switches 141, 111 and 160 will remain in the same position they occupied when the arm 186 was in a horizontal position, or the upper two of these last named switches are closed while the lowermost is opened. It is to be understood that the specific switch just described is merely one form of a switch which may be utilized and is not intended to in any way limit the present invention.

To complete the description of the details of apparatus embodied in the present invention, reference should now be made to Figs. 7 and 8, which illustrate the valves. As shown, the valves comprise an ordinary wedge type gate valve comprising a valve body 210 and wedge shaped gate 211. The valve is shown in its closed position with the gate 211 in its lowermost position, so that it abuts against the face plates 212 in the valve body, thereby closing the passage through the valve. An annular channel 213 is provided in the valve body about the circumference of the gate 211 and is in open communication with chamber 215 formed by the hemispherical cover piece 216. The gate 211 is raised and lowered by valve stem 217 which passes through chamber 215 and has suitable packing held in place by packing nut 218 where the valve stem passes through the cover plate 216. The upper portion of the valve stem is threaded and motor 219, suitably supported from the valve body, and operating through suitable speed reducing gearing contained in gear box 220, raises and lowers the valve stem 217 in the manner customary in motor operated valves.

An extension 221 is secured to the upper end of the valve stem 217, and suitable projections 222 and 223 are attached to the extension 221. Preferably the ends of the extension 223 are threaded, and the projections 222 and 223 take the form of nuts which may be vertically adjusted on the extension. Suitable means, such as lock nuts, are provided to hold the nuts 222 and 223 in their proper position if desired. As stated, the valve is shown in its lowermost position, so that the extension 221 is likewise in its lowermost position. A plate 224 is supported above the gear housing 220 by suitable means, such as by pipe 225 surrounding the extension 221. Mounted on plate 224 is switch box 180 and standard 225. A suitable housing 226 may be secured to plate 224 around the switch box 180 and a pipe 227, having cap 228, may be secured to the housing 226. The nut 223 on extension 221 is so adjusted that when the valve is in its closed position nut 223 will contact wheel 187, carried by arm 186 of the switch mechanism heretofore described, thereby depressing arm 186. Nut 223 likewise contacts and depresses lever 229 supported by standard 225, thereby depressing link 230 and lever 231. An ordinary whistle valve 232 is mounted on the gear box 220 and its stem 233 is adapted to be depressed by lever 231.

Steam is admitted to the valve 232 through pipe 234, and when the valve stem 233 is depressed the valve is opened so that steam now flows from pipe 234 through the valve 232 and out through pipe 214 to the channel 213 in the valve body 210. As soon as the valve has started to rise, it is, of course, apparent that the valve stem 217 will rise and extension 221 carried thereby will likewise rise. The nut 223 on extension 221 will also rise and therefore the wheel 187 on arm 186 is raised to its horizontal position by the action of spring 188. The whistle valve 232 is normally actuated to a closed position by a spring and therefore the lever 229 is raised as the whistle valve stem 233 rises when the nut 223 rises. When the valve gate 211 nears its uppermost position, the projection 222 carried on extension 221 of the valve stem 217 contacts the wheel 187 on arm 186 thereby raising the arm and thus affecting the operation of the switches as heretofore described. However, since the lever 229 is already raised, it is not affected by the nut 222 on opening the valve. The steam is fed from line 234 through whistle valve 232 and line 214, to the channel 213 surrounding the gate 211 when the valve is in its closed position, in order to prevent leakage of reactants through the valve. Thus, assuming that reactants under forty pounds per square inch pressure are flowed through opening 235 of the valve, steam or other inert fluid under a higher pressure, say fifty pounds per square inch, is supplied to the channel 213 so that in the event of leakage around the valve, all the leakage will be of an inert medium and not of a reactant.

In order to describe the operation of the valves, the operation of the Steam out valve will now be described in detail, it being remembered that the operation of the other valves is similar unless otherwise specifically noted. There are four operations performed in operating the Steam out valve which are:

1. Opening the valve, i. e., closing the switch operating the motor of the valve so as to furnish current to the motor to operate the motor in such direction that it opens the valve. It requires approximately ten seconds for the valve to go from complete shut to complete open.

2. Approximately twenty seconds after the opening operation is started, the open test is carried out to make sure that the valve has completely opened.

3. When it is desired to close the Steam out valve, the closing operation is performed, i. e., the motor operating switch 49 is reversed so that power is furnished to the motor to operate the motor in the direction so that the valve is closed. This closing operation likewise requires about ten seconds.

4. Therefore, approximately twenty seconds after the closing is started the valve is tested to see that it has completely closed.

Carrying out these operations in detail, it will be assumed that the brush 13 is in contact with the commutator segment 2 connected to line 117, which furnishes power for controlling the opening operation of the valve, the brush 13 being moved into this position either by cranking the arm 12 manually, or by the operation of the timer motor. When the brush 13 is in the center of the commutator segment 2, an impulse of approximately two seconds duration is sent through this brush, and thence through the commutator segment 2 and line 117, either by depressing the impulse button 106, if operating manually, or by the closing of the contact points 19 if operating automatically. The current through line 117 flows through switch 118 to line 119 and coil 50, energizing the same and closing motor operating switch 49, thereby making power available from lines 125 through switches 124 to lines 126 and to the motor.

The control circuit is completed from coil 50 through line 120 and switch 121 on the Steam out valve, which is closed when the valve is closed, and thence through line 122 and bus 123 to supply line 65. As soon as the switch 124 closes, the switch 118 closes across poles 127 and 128, so that current for energizing coil 50 and thus holding switches 124 closed is furnished from line 140 from the automatic or manual relay rather than from line 117 from the timer. Thus coil 50 is energized and switch 124 is kept closed until the Steam out valve has completely opened, at which time switch 121 opens, thereby breaking the circuit through coil 50 and permitting switch 124 to open. As soon as the Steam out valve begins to open, switch 141 will close, thereby closing the circuit from line 123 through line 142 to red light 143 for the Steam out valve, and thence through line 144 to line 60 to the supply line 59, thereby lighting the red light. When the Steam out valve was closed and until it was completely opened, the switch 145 on the Steam out valve was closed, thereby supplying power through line 146 to the green light 147 of the Steam out valve, so that while the valve is opening, both the red and green lights for the Steam out valve are lighted. When the valve has completely opened the switch 145 opens, thereby turning off the green light. Similarly, when the valve is completely opened, switch 148 opens, thereby breaking the circuit from the open test line 149 to line 112 leading to test bus 113, while switch 111 closes, thereby completing the circuit from closed test line 110 to line 112 and test bus 113.

As stated above, twenty seconds after the valve has started opening, the brush 13 is moved into contact with the commutator segment 2 connected with open test line 149, and when the brush is in the center of this segment an impulse is sent therethrough and as the valve is completely open, the circuit is broken at switch 148 as heretofore described so that nothing happens. However, if the valve is not completely opened, switch 148 is closed so that current will pass through switch 148 and line 112 to the test bus 113 to the trip relay coil 114 and thence to supply line 65, thereby energizing the trip relay coil and breaking the contact between switch 118 and switch point 115, thereby de-energizing the alarm relay and causing the alarm bell to ring as heretofore described. The operator can then see, since both the red and green lights for the Steam out valve are burning, that this valve is not completely open and can take steps to remedy the difficulty.

If the operator moves the alarm switch 75 so that it rests on contact point 90, thereby shutting off the alarm bell, as soon as the alarm relay is again energized to permit operation, the bell will start ringing and he must throw the alarm switch back to rest on contact point 76, which is the proper position for it during operation. After the Steam out valve has been opened as long as necessary, and it is desired to close the valve, the brush 13 is moved into contact with the commutator segment 2 connected with the line 150, furnishing current for controlling the closing operation of the valve. In this way current is furnished through line 150 and switch 151 to line 152, through coil 51 and line 153 and torque switch 154 to supply bus 123, thereby energizing coil 51 and closing switches 155, thus making current available from lines 125 through switches 155 to lines 126 for operating the motor in a direction to close the Steam out valve. As switches 155 are closed, switch 151 moves from contact with line 150, to contact with poles 156 and 157, thereby furnishing power from line 140 for energizing coil 51 until the valve is completely closed, at which time torque switch 154 will open to de-energize coil 51 and permit switches 155 to open, thus stopping the motor 48. As soon as the valve starts to close, switches 121, 145 and 148 will close. The closing of switch 145 completes the circuit through the green light 147 for the Steam out valve, causing this light to burn. However, since switch 141 does not open until the valve has completely closed, the circuit through the red light 143 for the Steam out valve is closed, and therefore both the red and green lights for this valve will be burning until the valve reaches its completely closed position. When the valve has completely closed, the switch 141 is opened, thereby turning off the red light 143. Likewise, switch 111 is opened to break the closed test circuit.

As stated heretofore, the valve will require about ten seconds to close, and therefore when on automatic control approximately twenty seconds after the closing operation has been started the valve is tested to see that it has closed. To do this, the brush 13 during its rotation moves into contact with a commutator segment 2 connected to the closed test line 110 and an impulse is sent through this line 110 and if the valve is completely closed the switch 111 is open, thus breaking the test circuit, and nothing happens. However, if the valve is not completely closed, the test circuit is closed through switch 111 to line 112 and thence through test bus 113 to the relay coil 114, thus energizing this coil and breaking contact between switch 116 and contact point 115, and de-energizing the alarm relay and causing the alarm bell to ring as heretofore described. The operator can then see that the Steam out valve is not completely closed, since both the red and green lights for it will be burning brightly, during manual control the operator will watch these lights to see if one operation has been completed before proceeding to the next and therefore the test operation described above is only necessary during automatic control.

It will be noted that only five switches have been described in connection with the Steam out valve, while the "Vapor in," "Vapor out," "Air in," "Air out," valves have six switches shown which are operated by the valve stem. The additional switches in connection with these valves are interlocking switches, so that the operation of these valves is interlocked, and thus the "Air in" or "Air out" valves cannot be opened unless the "Vapor in" and "Vapor out" valves are closed, and vice versa. Thus it is seen by a glance at Fig. 1B that the switches 121 of the Air in and Air out valves through which current must flow to operate the motor operating valve 49 are not connected directly to the supply bus 123, but instead, the switches 121 of the Air out and Air in valves are fed from supply bus 123 through line 161 having the interlock switches 160 of the Vapor in and Vapor out valves in series therein, and thence through lines 158 or 159 to the switches 121 of the Air out or Air in valves, respectively.

Thus, since the interlock switches 160 of the Vapor in and Vapor out valves are only closed when these valves are in fully closed position, and since the current for operating the motor switch for either the Air in or Air out valves must flow through the interlock switches 160 of the Vapor in and Vapor out valves in series, then, unless these valves are both closed, neither the Air in nor Air out valve may be opened. Likewise, the switches 121 of the Vapor in and Vapor out valves are not directly connected to the supply bus 123, but are fed from supply bus 123 through line 162 having the interlock switches 160 of the Air in and Air out valves in series therein, and thence through line 162 to the motor switch 121 of the Vapor out valve or line 163 to the motor switch 121 of the Vapor in valve. In this way, since the interlock switches 160 of the Air in and Air out valves are only closed when these valves are completely closed, it is apparent that unless these valves are closed current for operating the motors of the Vapor in or Vapor out valves cannot be obtained.

For a more complete description of the operation of the present apparatus, reference will now be made to Fig. 9. As shown in Fig. 9, all reactants to the case 165 are fed through inlet manifold 166, and all reaction products are withdrawn from the case 165 through outlet manifold 167. The lines conveying the steam, vapor and air to the inlet manifold 166 are lines 168, 169 and 170, respectively, and having therein motor operated valves 171, 172 and 173, respectively. The lines 174, 175 and 176 convey the steam, vapor and air respectively from the outlet manifold 167, and have therein motor operated valves 177, 178 and 179, respectively. As heretofore stated, the particular timer mechanism herein described is designed to operate on a 45 minute cycle, or a 2700 second cycle, and the commutator 1 is divided into 270 segments. Thus, the arm 12 will make a complete revolution every 45 minutes, and the brush 13 will contact a different segment 2 of the commutator every ten seconds.

It is to be understood, of course, that by changing the speed of the arm 12, or by increasing the number of segments in the commutator, the number of operations possible, or the time interval between the operations, may be varied through wide limits. However, the following sequence of operations is illustrative of the operation of a timer such as embodied in the present invention.

At the start of the cycle at 0' and 0", the vapor outlet valve 178 is opened. At 0'10", when the brush 13 is moved to the next segment of the commutator, the vapor inlet valve 172 is opened so that reactants now flow into the case 165 through line 169 and inlet manifold 166 and the products are removed through outlet manifold 167 and line 175. At 0'20" when the commutator brush 13 has moved into contact with the next commutator segment, the vapor outlet valve 178 is tested to see that it has completely opened. At 0' and 30" the vapor inlet valve 172 is tested to see if it has completely opened. If the valves are completely opened, the test circuit has been broken as heretofore described, and nothing will happen. However, if the valves should not be completely open the alarm bell will be energized and the operator must then see that the valves open. The vapor may remain on stream for one-third of the cycle or 15' (i. e. 15' after the vapor inlet valve should be completely opened), or 15'20" from the start of the cycle, the brush 13 will come into contact with the segment of the commutator which is connected to the circuits for starting the closing operations of both the vapor inlet valve 172 and the vapor outlet valve 178, thereby closing these circuits and starting these valves to close.

Since no operations are performed from 0'30" to 15'20", or a period of 14'50", 88 segments of the commutator 1 will be dead and not connected to any circuit. At 15'30" the brush 13 will pass over a dead segment of the commutator 1 and at 15'40" the brush 13 will come in contact with the next segment of the commutator 1 which may be connected to the closed test circuits of the Vapor in and Vapor out valves, and to the opening circuit for the steam outlet valve, thereby testing the vapor valves and starting the opening of the steam outlet valve. At 15'50" the brush 13 is in contact with the next segment of the commutator which is connected to the circuit for opening the steam inlet valve 171. At 16'0" the brush is in contact with the next segment of the commutator connected to the open test circuit for the steam outlet valve 177 and at 16'10" the brush is in contact with the next segment of the commutator which is connected to the open test circuit for the steam inlet valve 171. The steaming may continue for approximately 6½' or the next 37 segments of the commutator will be dead.

At 22'30" the brush 13 comes in contact with the segment of the commutator 1 connected to the closing circuit for the steam inlet valve 171. At 22'40" the brush 13 comes in contact with the segment of the commutator connected to the closing circuit of the steam outlet valve 177. At 22'50" the brush 13 contacts the segment of the commutator connected to the closed test circuit for the steam inlet valve 171. At 23'0" the brush 13 contacts the segment of the commutator connected to both the closed test circuit for the steam outlet valve 177 and the opening circuit for the air outlet valve 179. At 23'10" the brush 13 contacts the segment of the commutator connected to the opening circuit for the air inlet valve 170. At 23'20" the brush 13 contacts the segment of the commutator connected to the open test circuit for the air outlet valve 179. At 23'30" the brush 13 contacts the segment of the commutator connected to the open test circuit for the air inlet valve 173.

The regeneration with air may require approximately one-third of the cycle or 15', or the next 87 segments of the commutator will be dead. At 38'10" the brush 13 contacts the segment of the commutator connected to the closing circuit for the air inlet valve 173 and at 38'20" the brush 13 contacts the segment of commutator connected to the closing circuit for the air outlet valve 179. At 38'30" the brush 13 contacts the segment of the commutator connected to the closed test circuit of the air inlet valve 173, and at 38'40" the brush 13 contacts the segment of the commutator connected to both the closed test circuit for the air outlet valve 179 and the opening circuit of the steam outlet valve 177. At 38'50" the brush 13 contacts the segment of the commutator connected to the opening circuit of the steam inlet valve 171. At 39'0" the brush 13 contacts the segment of the commutator connected to the open test circuit for the steam outlet valve 177. At 39'10" the brush 13 contacts the segment of the commutator connected to the open test circuit for the steam inlet valve 171.

The steaming may continue 5½' or the next 31 segments of the commutator will be dead. At 44'30" the brush 13 contacts the segment of the commutator connected to the closing circuit of the steam inlet valve 171, and at 44'40" the brush 13 contacts the segment of the commutator connected to the closing test circuit for the steam outlet valve 177. At 44'50" the brush 13 contacts the segment of the commutator connected to the closed test circuit for the steam inlet valve 171. At 45'0" the cycle has been completed and a new cycle is started, the brush 13 contacting the segment of the commutator which is connected to both the closed test circuit for the steam outlet valve 177, and the opening circuit for the vapor outlet valve 178.

While various specific details of construction have been herein described, it is to be understood that such details are not intended to limit the invention in any way, and that various specific embodiments of the invention may be used without departing from the spirit of this invention or the scope of the appended claims.

What we claim and desire to protect by Letters Patent is as follows:

1. A system of control for a group of valves used in a cycle of operation and wherein during the cycle the valves are operated at predetermined time intervals and the valves tested after each operation is completed, which comprises a motor for operating each valve, an operating circuit for each valve motor, a controller switch for energizing the motor operating circuits, means for maintaining said motor operating circuits energized for predetermined time periods, an independent electrical test circuit for each valve, said controller switch being timed to maintain at least one valve motor operating circuit in energized condition while the condition of operation of a valve by a previously energized operating circuit is tested, a control circuit for deenergizing an energized valve motor operating circuit, switch means controlled by each valve operation and being operable when a tested valve shows improper operation to cause said control circuit to stop the operation of a valve motor.

2. An automatic control for a group of valves which are operated over a predetermined time period to regulate the flow of fluids during a process cycle and wherein at least two of the valves are in the course of operation at the same interval of time comprising motive means for operating each valve, an operating circuit for each motive means, a time control switch for energizing the operating circuits in sequence, means for maintaining said operating circuits energized for predetermined time periods, an independent electrical test circuit for each valve, said test circuits being energized in sequence by said time controlled switch and after each valve motor operating circuit has been energized for its predetermined time period, in order to test each valve operation, a control circuit for deenergizing the motor operating circuits, switch means controlled by each valve operation and being operable when a tested valve shows improper operation to cause said control circuit to instantly deenergize the motor operating circuits.

3. An automatic control for a group of valves at least two of which are operating during a predetermined time period of a process cycle to regulate the flow of processing fluids, comprising electrically actuated motors for operating each valve, an electrical power source, a series of contacts, a time controlled energizer for supplying current from said source to said contacts in sequence, independent electrical operating circuits connected to certain of the contacts for supplying current therefrom to the valve motors, means for maintaining said operating circuits energized for predetermined time periods, an independent electrical test circuit for each valve from others of said contacts, said test circuits being energized in sequence by said time controlled energizer and each after its motor operating circuit has been energized for its predetermined time period, in order to test each valve operation, a control circuit for deenergizing the motor operating circuits, switch means controlled by each valve operation and being operable when a tested valve shows improper operation to cause said control circuit to stop the operation of the valve motors instantly.

HENRY THOMAS.
JOHN M. PEARSON.
EDWARD J. NOPPER.